J. FREDETTE.
BLADE FORMING APPARATUS.
APPLICATION FILED SEPT. 29, 1917.

1,322,005.

Patented Nov. 18, 1919.
4 SHEETS—SHEET 1.

INVENTOR.
John Fredette
BY
Green & McCallister
ATTORNEYS.

J. FREDETTE.
BLADE FORMING APPARATUS.
APPLICATION FILED SEPT. 29, 1917.

1,322,005.

Patented Nov. 18, 1919.
4 SHEETS—SHEET 3.

J. FREDETTE.
BLADE FORMING APPARATUS.
APPLICATION FILED SEPT. 29, 1917.

1,322,005.

Patented Nov. 18, 1919.
4 SHEETS—SHEET 4.

INVENTOR.
John Fredette
BY
ATTORNEYS.

UNITED STATES PATENT OFFICE.

JOHN FREDETTE, OF WILKINSBURG, PENNSYLVANIA, ASSIGNOR TO WESTINGHOUSE ELECTRIC & MANUFACTURING CO., A CORPORATION OF PENNSYLVANIA.

BLADE-FORMING APPARATUS.

1,322,005.         Specification of Letters Patent.        Patented Nov. 18, 1919.

Application filed September 29, 1917. Serial No. 194,066.

*To all whom it may concern:*

Be it known that I, JOHN FREDETTE, a citizen of the United States, and a resident of Wilkinsburg, in the county of Allegheny and State of Pennsylvania, have made a new and useful Invention in Blade-Forming Apparatus, of which the following is a specification.

This invention relates to blade forming apparatus and has for an object to produce a new and improved machine for forming blades.

A further object is to produce a machine for simultaneously cutting in two directions with the same cutter.

A further object is to produce an apparatus for machining diverging passageways in turbine blades or in any flat or curved surface.

A further object is to produce a machine for taking straight and diagonal cuts on the work without necessitating the removal or the adjustment of the work on its holding or supporting device, or the changing of the angle of the latter in relation to the tool.

A further object is to produce an apparatus for rapidity and accurately producing a large number of duplicate pieces, each having a slot with divergent walls formed in one of its cylindrical surfaces.

A further object is to produce a machine in which new and improved means are provided for holding the work in correct relation with the cutter.

These and other objects are attained by means of apparatus embodying the features herein described and illustrated in the drawings accompanying and forming a part hereof.

My invention is well illustrated by a machine adapted to be employed in milling the convex faces of blades, such as are shown in Fig. 5. The blades 3 there illustrated are of the familiar impulse type, each being provided with a concave working face 2 and a convex face $2^a$, the cross-section of each blade being substantially crescent shaped.

Each blade illustrated is so formed that it is provided with a forwardly projecting spacing member $3^a$, which overhangs the face $2^a$ and is integrally formed on the outer end of the blade. The other end or mounting shank $3^b$ of the blade is so formed that it also forms a spacing member and projects forwardly beyond the convex face $2^a$. The forward edges of the member $3^a$ and the shank $3^b$ are convex and their contour is such that they are adapted to fit snugly against the convex face 2 of an adjacent blade, when the blades are assembled in a row. The members $3^a$ of the blades of a row also coöperate to form an outer shroud for the blades and they coöperate with the shanks $3^b$ to form passageways between adjacent blades of the row. In the blades illustrated, the passageways diverge from the inlet to the outlet side and the divergence is accomplished by so forming the passageway-bounding face of each member $3^a$ and each shank $3^b$ that it is inclined at the desired angle to the axis of the blade. The machine illustrated as an embodiment of my invention is adapted to be employed in milling blade blanks so as to form the face $2^a$ and the members $3^a$ and $3^b$ on blades similar to those illustrated in Fig. 5.

In the apparatus illustrated as an embodiment of my invention the blade blanks are mounted face inward on a drum, and in circumferential and longitudinal rows. The drum is rotated in front of a plurality of cutters mounted on the arbor of a milling machine. A cutter is provided for each circumferential row of blanks, so that the longitudinal rows of blanks are successively operated on by the cutters as the drum is rotated. The drum is also moved toward and away from the cutters, as it is rotated, by means of cams so that the work is cut to the correct transverse contour. This operation forms a slot with parallel ends and a convex floor in the convex face of each blade blank. In order to make the passageway diverge from the inlet side to the outlet side of the blade, the above operation is repeated and at the same time the drum is given a longitudinal movement so that the resulting path followed by each cutter on the back of each blade is at an angle to the axis of each blade. Obviously the main portion of the slot may be cut first and then each side tapered off by a separate operation, or else the straight cut may be omitted and the whole divergent slot formed by two successive inclined cuts. Rough and finished cuts may both be taken if a preliminary rough cut is found necessary to produce accurate work. It will, of course, be understood that this depends to a large extent upon the amount of material to be removed and on the rigidity of the apparatus.

In carrying out my invention the apparatus may conveniently be mounted on an ordinary milling machine and I preferably employ fluid pressure, such as compressed air, for controlling the movements of the work holding drum.

In the drawings: Figure 1 is a sectional elevation of a blade forming apparatus embodying my invention, the section being taken along the line 1—1 of Fig. 2.

Figure 1:
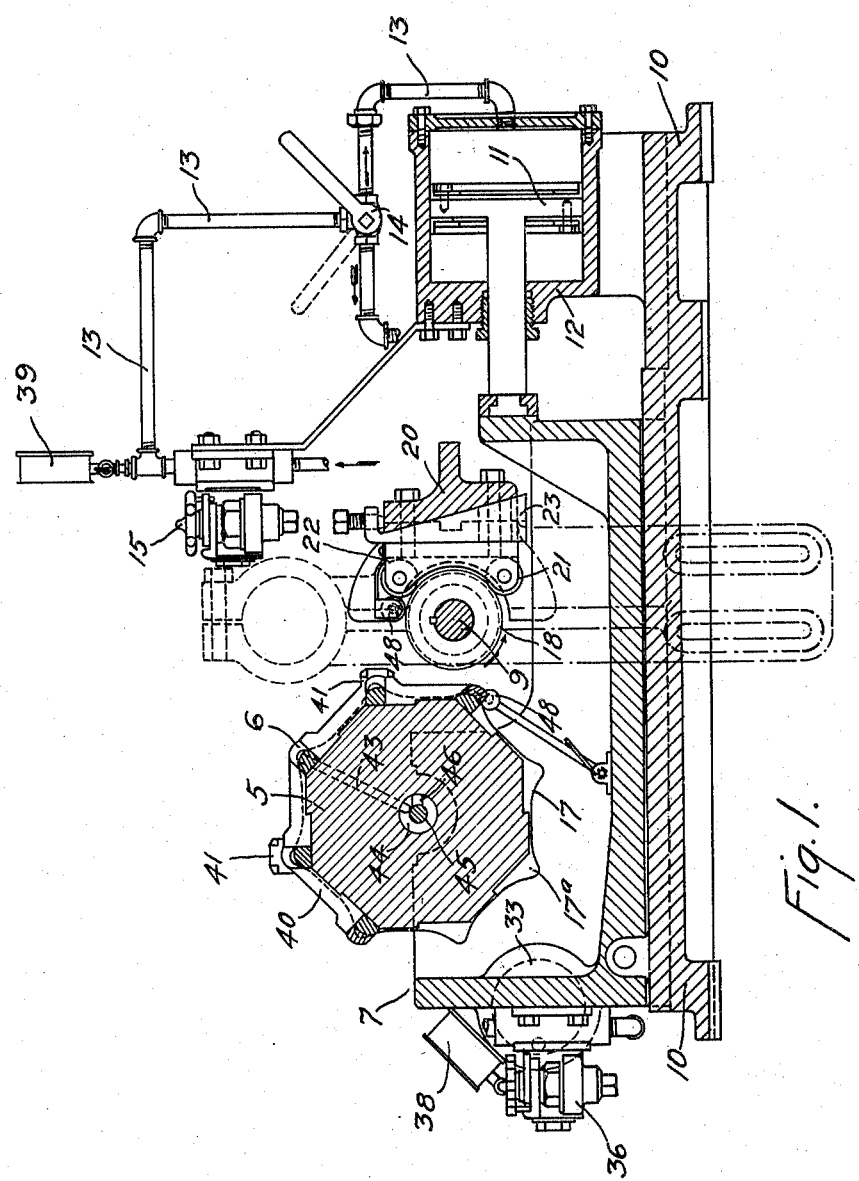

In the drawings I have illustrated a preferred embodiment of my invention which may be employed in conjunction with an ordinary milling machine in machining turbine blades. The apparatus illustrated is provided with a rotatable drum 5, on which the blade blanks 6 to be machined are secured face inward in longitudinal and circumferential rows. The drum is rotatably mounted on a saddle 7 with its axis parallel to the axis of the spindle 8 and arbor 9 of a milling machine, not shown. The saddle is slidably mounted on a base plate 10, which may be secured to the table of the milling machine. As shown, the saddle 7 may be moved longitudinally back and forth on the base plate 10 by means of a piston 11, which operates in a cylinder 12, mounted on one end of the base plate 10.

At each end of the drum 5, I have shown a cam 17 which is adapted to coöperate with a roller 18 mounted on the arbor 9, so as to cause the drum 5 and the saddle 7 to move toward and away from cutters 16, mounted on the arbor 9 of the milling machine, and to thereby form a slot 19 of the correct contour in each blade blank 6 on the drum as the latter is rotated. The cams 17 are held against the rollers 18 by fluid pressure, hereinafter called air pressure, in the cylinder 12, so that the distance between the axis of the drum and the axis of the arbor is dependent on the contour of the cams 17. As the blade blanks 6 are mounted on the drum 5 in both circumferential and longitudinal rows it is evident that the cutters operate successively on the longitudinal rows of blanks as each cutter works along its circumferential row. In the apparatus illustrated, the rollers 18 are made the same size as the cutters, for the finishing cut, and the cams 17 are formed with a cam face 17ª in line with each row of blades of the exact contour of the bottom of the slot to be cut in each blade.

Figure 2:
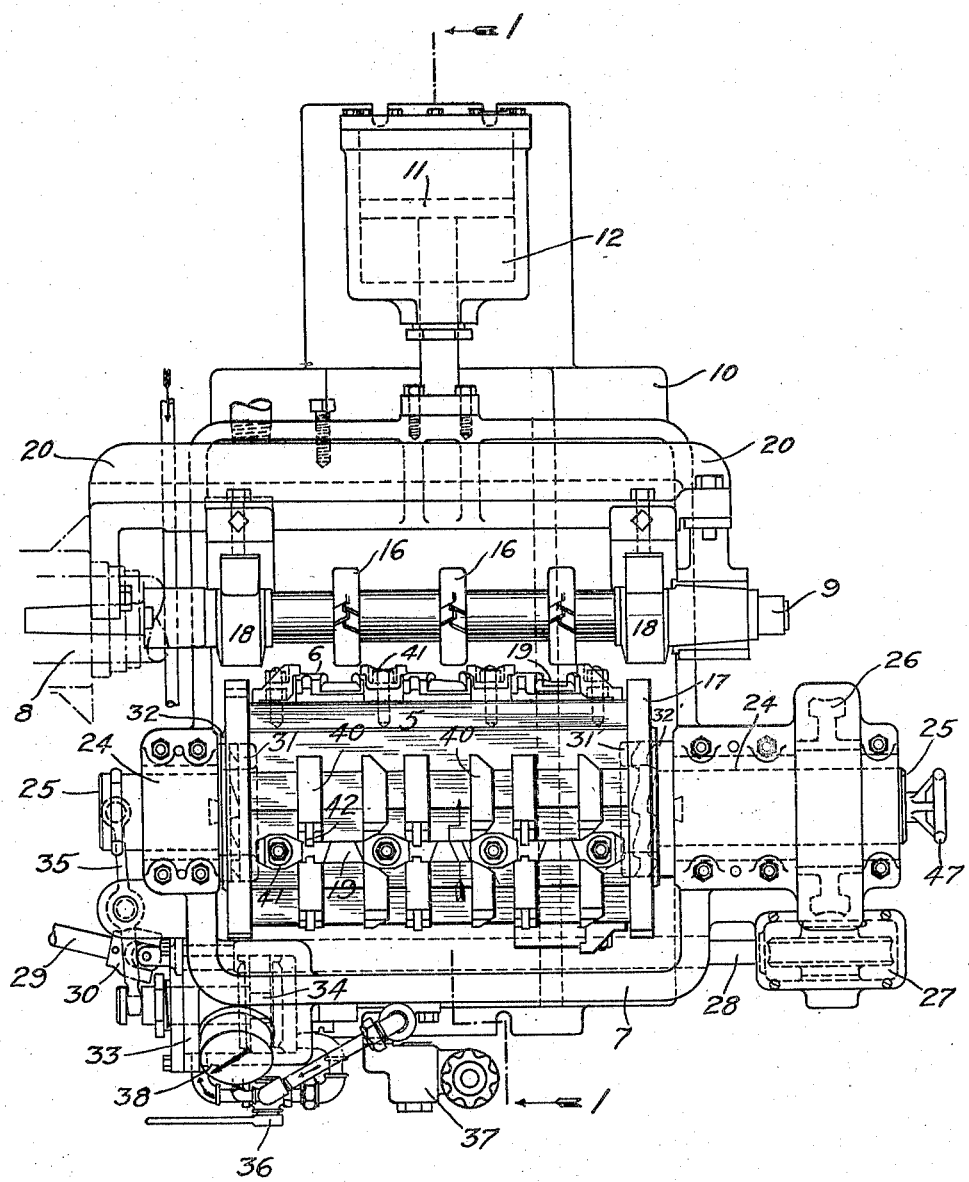
Fig. 2 is a plan view of the apparatus illustrated in Fig. 1.

The air pressure on the piston 11 is sufficient to effectually overcome the thrust of the cutters 16 against the work so that a smooth surface of the proper curvature is machined without chatter marks. As shown in Fig. 2, the cutters 16 are provided with double helical teeth which eliminate end thrust, and, because of the inclination of the teeth to the axis of rotation, eliminate any tendency to chatter or to gouge the work, thereby enabling a smooth cut to be made without necessitating excessive air pressure in the cylinder 12 or excessive bearing pressure between the cams 17 and the rollers 18. In the apparatus illustrated both the drum 5 and the cutters 16 are preferably rotated counter-clockwise.

The arbor 9 is mounted in one end of the spindle 8 and is shown as supported at its outer end by means of a support or brace 20, which is bolted to the frame of the milling machine. Behind each cam roller 18, I have shown adjustable rollers 21 for transmitting the thrust of the cams 17, against the cam rollers 18, to the arbor support 20, thereby overcoming any tendency of the arbor to spring away from the work, and also relieving the spindle and arbor bearing of most of the thrust load. As shown, the rollers 21 are mounted on a block 22, between which and the arbor support 20 is an adjustable wedge 23 for adjusting the pressure of the rollers 21 against the cam roller 18.

In Fig. 2, I have shown the drum 5 supported in bearings 24, carried by the saddle, and also the mechanism for rotating the drum. As shown, the drum is mounted on a shaft 25 which is journaled in the bearings 24, and which may be made as an integral part of the drum. On the outer end of this shaft a worm wheel 26 is mounted preferably with a feather key, not shown, so that the shaft and drum may be moved to different longitudinal positions while the drum is being rotated by the worm wheel. The worm wheel 26 is driven by means of gearing 27 and a shaft 28, which extends underneath the saddle to the inner side thereof and is connected to the mechanism of the milling machine in a well known manner by means of an extensible shaft 29 having universal joints 30 at each end so as to compensate for movements of the saddle 7.

In order to move the drum 5 longitudinally and to thereby cause the cutters 16 to take a diagonal cut on the work, I have provided cams 31 and 31' on each end of the drum for coöperating with cams 32 and 32' mounted on the saddle 7, adjacent to the bearing 24 of the drum shaft 25. As shown, each set of cams is provided with sloping teeth which cause the drum to be moved a certain distance longitudinally during the period in which each row of blade blanks passes by the cutters, and to be quickly returned to the longitudinal starting point after one row of blanks has been machined and before the next row comes into contact with the cutters as the drum 5 is rotated.

I have shown a compressed air cylinder 33 mounted on one end of the saddle 7 for controlling the longitudinal position of the drum 5. As shown, the piston 34 in this cylinder is connected to a shaft 25 of the drum 5 by means of a pivoted arm or lever 35 so that when air under pressure is admitted to one end of the cylinder the drum is held against one set of cams and when admitted to the other end of the cylinder, the opposite set of cams is brought into and held in engagement. Obviously, the piston 34 may be manipulated so as to hold the drum 5 in an intermediate position, in which case neither the cams 31, 32 nor 31', 32' are in engagement and the cutters 16 will take a straight cut across the work as it is moved past them by the rotation of the drum 5.

I have shown a hand operated three-way valve 36 for controlling the delivery of air to and from the opposite ends of the cylinder 33 and a pressure regulator 37 for maintaining the pressure substantially constant in this cylinder. A pressure gage 38 is also provided.

In Fig. 1, I have shown piping 13 for delivering air under pressure to and from the opposite ends of the cylinder 12. The drum 5 may be moved to an operative position with the cams 17 against the rollers 18, or to an inoperative position well away from the cutters 16 by manipulating a threeway valve 14 provided in the piping 13. I have also provided a pressure regulator and a pressure gage 39 in the piping 13.

Figure 3:
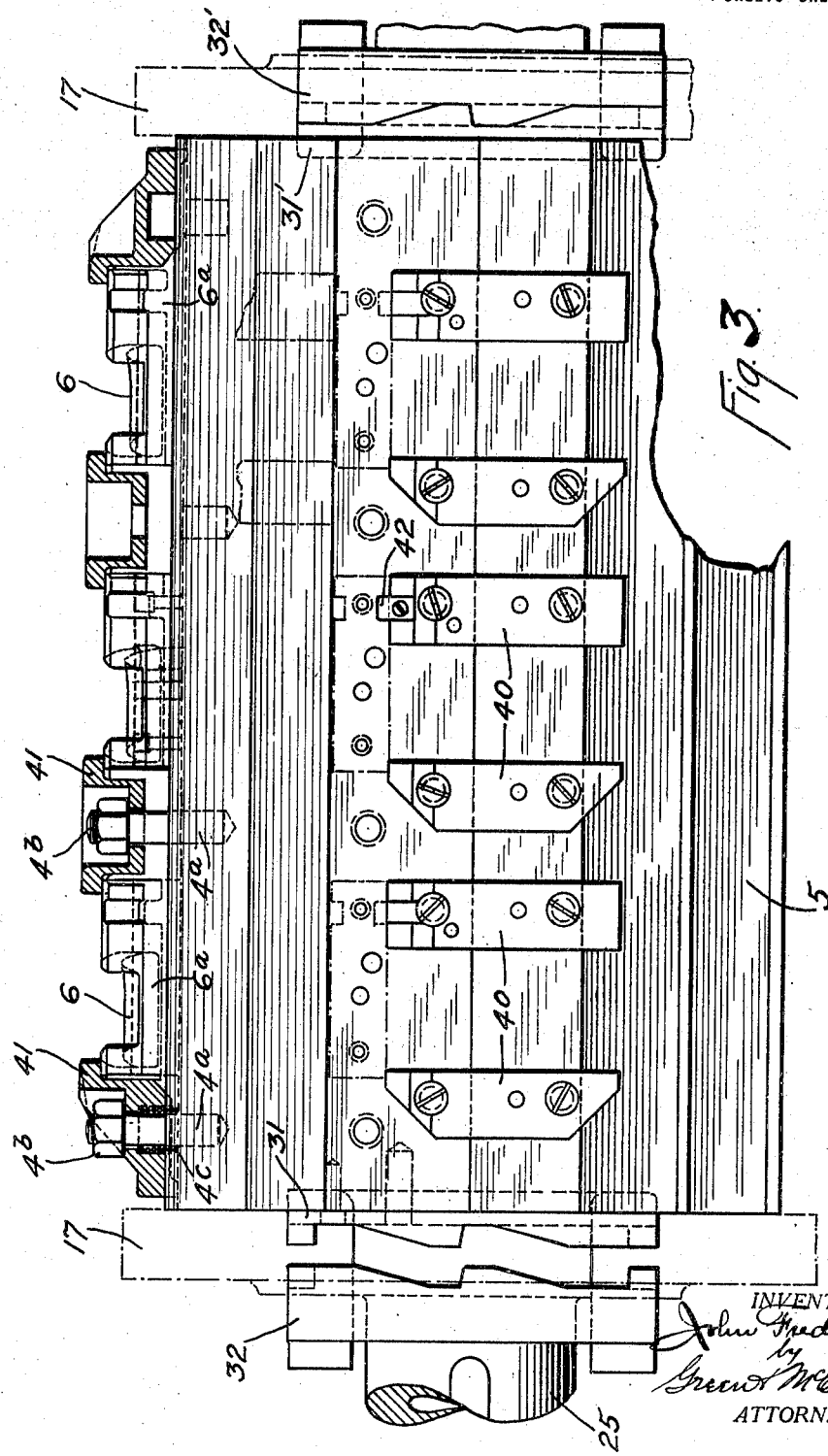
Figs. 3 and 4 are detailed views, on an enlarged scale, of a part of the apparatus illustrated in Figs. 1 and 2.
Figure 4:
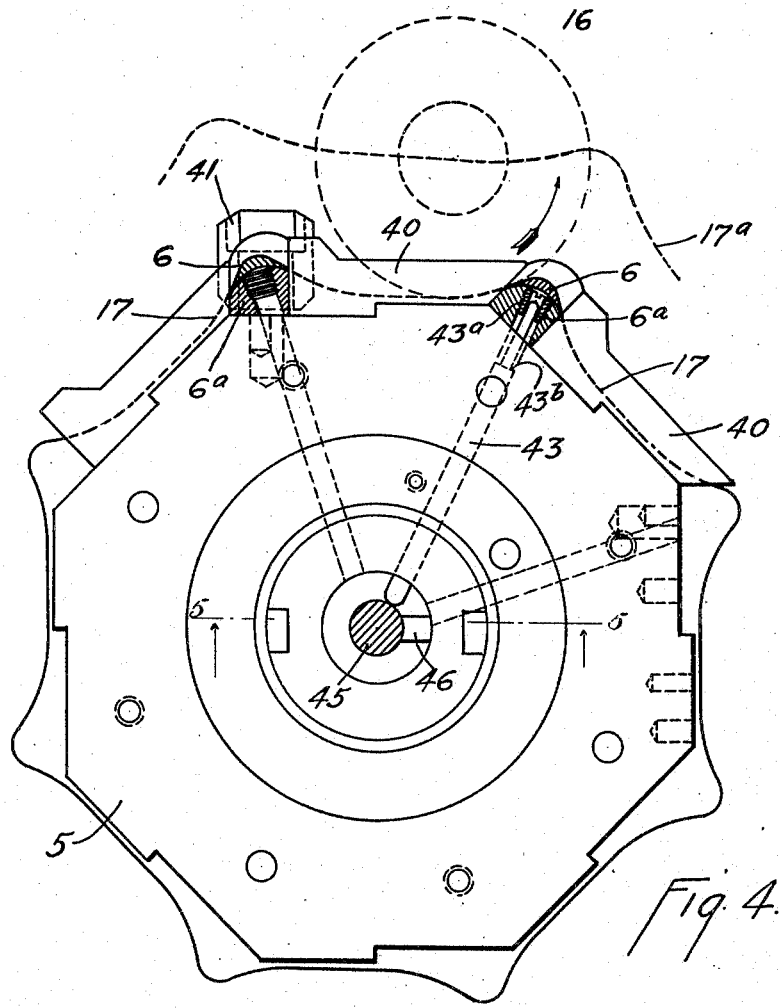

The turbine blanks 6 are shown in Fig. 2 in plan and elevation as mounted on the drum 5 between spacing pieces 40 (see also Figs. 3 and 4) which accurately locate them so that all of the work will be uniform. The blanks are secured in place by means of clamps 41 provided with a tightening bolt 4$^a$ and nut 4$^b$ which may be screwed down after the blanks have been inserted between the spacing pieces 40. Under each clamp I have provided a spring 4$^c$ for raising the clamp from the work when the nut 4$^b$ is unscrewed, thereby facilitating the removal of the finished blade and the insertion of a new blade blank. As shown, each blade is provided with two slots in the shank, one of which in each blade blank is engaged by projections 42 on the adjacent spacing piece. The blanks are therefore securely and accurately located in place so that both straight and diagonal cuts may be taken across them. On one of the blades in plan view in Fig. 2, I have indicated by means of an arrow the path of the cutter across the blade when the outer end of the steam passageway 19 in the blank is tapered off. During this operation, the end cams 31 and 32 and also the main or drum cams 17 and the rollers 18 will be held in engagement. It will be understood that the path indicated by the arrow is merely illustrative, as in this embodiment of my invention it is actually the drum 5 which is moved longitudinally and not the cutters 16. In Fig. 4, I have illustrated by means of a dotted line 17$^a$ the path of the axis of the cutter 16 relatively to the drum 5 as the latter is rotated, showing how the cutter produces a surface on the blade corresponding to the shape of the cam 17.

Figures 5, 6:
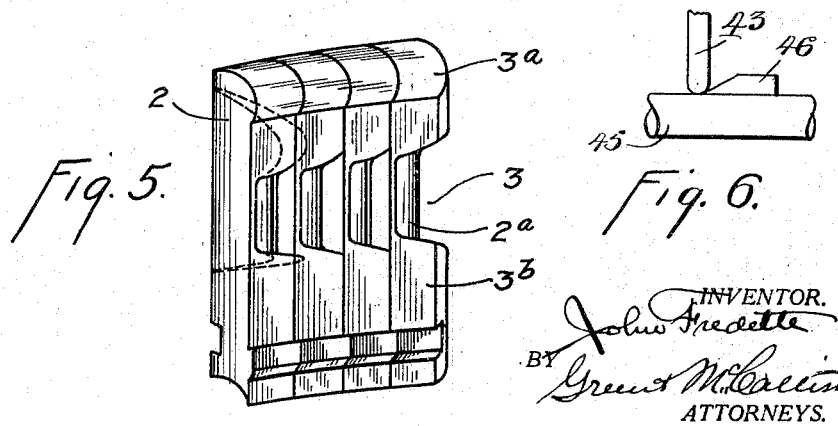
Fig. 5 is a perspective view of a row of turbine blades.
Fig. 6 is a view along the line 6—6 of Fig. 5.

In the sectional view of the drum in Fig. 1, and also in Figs. 4 and 6, I have shown a work ejector which consists of a radially extending rod 43 inserted in a hole in the drum 5 and terminating at its outer end directly under one of the blanks. As shown each blade blank 6 rests on a seat 6$^a$, which is shaped to fit the face of the blank. A small removable bushing 43$^a$ is inserted in this seat at the outer end of the hole through which the ejector rod 43 extends. The rod 43 is reduced in section at its outer end so that it may project through the bushing sufficiently to raise the finished blade 6 off the seat 6$^a$, and the bushing prevents the rod from falling out of the drum by reason of the shoulder 43$^b$ on the rod. A longitudinal hole 44 extends through the drum 5 and the drum shaft 25, through which a rod 45, carrying cams 46, extends. This rod may be turned until a cam 46 is in alinement with the inner end of the ejector 43, so that when the rod 45 is moved longitudinally the ejector 43 is raised by the cam 46 on the rod 45 and the blade is lifted off the drum by the outer end of the rod 43. It will, of course, be understood that an ejector is provided for each blade and that the rod 45 will be provided with at least a complete longitudinal row of the cams 46. A hand wheel 47 on the outer end of the rod 45 may be provided in order that the row of cams 46 may be brought into engagement with succeeding rows of ejectors 43, as the rows of blades 6 are finally machined.

A cutting lubricant is preferably supplied to the cutters 16, while they are in operation, and the saddle 7 is therefore provided with the proper walls and drain for catching and draining off this lubricant in a well known manner. I have also provided wipers 48 for wiping off the cams 17 and the cam rollers 18 just before they come in engagement. These wipers prevent chips from being carried between the cams and rollers, which would detrimentally affect the accuracy of the work. As shown, the end cams 31, 32, and 31', 32' are inclosed inside the bore of the cams 17, therefore they are effectually protected from dirt and chips.

The apparatus illustrated provides for the rapid and accurate production of a large number of duplicate pieces which would otherwise be difficult to machine because of their shape. By changing the shape of the cams, passageways or surfaces of corresponding shape may be machined. The cams preferably are held in engagement by compressed air and are subject to practically no wear. Furthermore, there is no back lash or lost motion between them as the same surfaces are always held in contact by the compressed air during operation.

It is evident that various changes, modifications, substitutions, omissions and additions may be made in the apparatus illustrated without departing from the spirit and scope of my invention as set forth by the appended claims.

What I claim is:

1. In a blade forming apparatus, a rotatable cutter, a rotatable work holding drum movable toward and from the cutter and also parallel to the axis thereof, cams for regulating the movement in each direction, means for holding said cams in engagement, means for rotating the drum, and means for rotating the cutter.

2. In a blade forming apparatus, a plurality of cutters, an arbor on which said cutters are mounted, means to which the work is secured for carrying said work against and past the cutters and means for simultaneously moving said work holding means longitudinally with relation to the arbor.

3. In a blade forming machine, a rotatable cutter, a rotatable drum on which the blade is mounted, a saddle on which said drum is mounted, resilient means for holding said saddle in such a position that the cutters operate on the blade on the drum, and cams for moving said drum and saddle in relation to the cutter for forming surfaces of definite contour on the blade.

4. A blade forming machine, comprising a rotatable cutter, a rotatable drum movable in both longitudinal and transverse directions with relation to the cutter and on which the blade blanks to be machined are mounted, cams for correctly spacing the drum from the cutter and for moving said drum with relation to the cutter to cause the cutter to form a curved surface on each blade blank, cams for simultaneously moving the drum longitudinally with relation to the cutter, and means for holding said cams in engagement.

5. In a machine of the character described, a cutter, a rotatable drum on which the work is mounted, means for rotating the drum to cause the work to be operated on by the cutter, means for varying the distance between the axis of the drum and the cutter during the rotation of the drum, and means for simultaneously shifting the relative positions of the drum and the cutter longitudinally of the drum.

6. The method of forming a blade, which consists in milling a straight slot transversely across a blade blank and in varying the depth of the slot to provide a blade face of the proper transverse contour and then in making said passage way diverging by repeating the first operation and simultaneously moving the blade blank longitudinally to cause the end wall of the slot to be milled diagonally while the cutter follows the transverse contour previously cut.

7. The method of forming a curved surface on a blade, which consists in simultaneously revolving the blade about a center outside of the blade and in contact with the cutter, moving the center of revolution of the blade toward and away from the cutter and moving the blade longitudinally in relation to the cutter.

8. In a milling machine fixture, a work holding drum, a saddle on which said drum is rotatably mounted, an arbor, cutters and rollers mounted in the arbor, cams on said drum for coöperating with the rollers, a base on which the saddle is slidably mounted, and a compressed air piston and cylinder for acting on the saddle to hold the cams in engagement with the rollers.

9. In a blade forming machine, a rotatable arbor, a plurality of cutters mounted thereon, supporting means for the arbor, a saddle movable transversely in relation to the arbor, a rotatable drum mounted on the saddle with its axis parallel with that of the arbor and movable along said axis, means for properly spacing the blade blanks on the drum and for locking the same in place, coöperating cams on the drum and arbor for causing relative movement therebetween and to thereby cause the cutters to cut a definitely shaped slot in each blade blank, means for holding said cams in engagement, cams at each end of the drum for causing longitudinal movement thereof for cutting the diverging sides of the slot, means for holding the cams at either end of the drum in engagement, means for rotating the drum, and means for rotating the arbor.

10. In a blade forming machine, a rotatable drum on which the blade blanks are mounted in a circumferential row, a cutter for operating on said blanks, and means for moving the drum toward and away from the cutter as the drum is rotated and the blanks are machined.

11. In a blade forming machine, a rotatable drum on which the blade blanks are mounted in a circumferential row, a cutter for operating on said blanks, means for moving the drum toward and away from the cutter as the drum is rotated and the blanks are machined, and means for simultaneously moving the drum longitudinally as each blade passes the cutter.

12. In a blade forming machine, a work holding drum on which the blade blanks are mounted, spacing members on the drum for accurately locating the blanks in circumferential rows, clamps for securing the blanks in place, and means for ejecting the blanks after they are machined.

13. In a blade forming machine, a work holding drum on which the blade blanks are mounted in longitudinal and circumferential rows, means for accurately spacing the blanks, means for clamping the blanks in place, a cam secured to or formed on each end of the drum having a portion in line with each longitudinal row of blades of similar contour to the surface to be machined on the blade blanks, and cams at each end of the drum for coöperating with the cams on the drum for moving the same longitudinally through a certain distance while each longitudinal row of blanks is being machined.

14. In a milling machine fixture, having an arbor with cutters mounted thereon, a work holding drum, cams on said drum, a saddle on which the drum is rotatably mounted, a base on which the saddle is slidably mounted, rollers fixed in position and which coöperate with the cams on the drum, and a fluid actuated piston for acting on the saddle to hold the cams in engagement with the rollers.

In testimony whereof, I have hereunto subscribed my name this 22nd day of September, 1917.

JOHN FREDETTE.

Witnesses:
C. W. McGhee,
M. B. Gordon.